United States Patent [19]
Pfeifer et al.

[11] Patent Number: 6,016,729
[45] Date of Patent: *Jan. 25, 2000

[54] TURRET DEVICE

[75] Inventors: Wolfgang Pfeifer, Esslingen, Germany; Kenji Sugimoto, Tokyo; Hiroshi Shinohara, Kawagoe, both of Japan

[73] Assignee: Citizen Watch Co., Ltd., Tokyo, Japan

[ * ] Notice: This patent is subject to a terminal disclaimer.

[21] Appl. No.: 08/945,392

[22] PCT Filed: Dec. 13, 1996

[86] PCT No.: PCT/JP96/03660

§ 371 Date: Oct. 27, 1997

§ 102(e) Date: Oct. 27, 1997

[87] PCT Pub. No.: WO98/25722

PCT Pub. Date: Jun. 18, 1998

[51] Int. Cl.[7] ................................................. B23B 29/24
[52] U.S. Cl. .................. 82/121; 82/136; 82/159; 82/905; 408/35; 29/40
[58] Field of Search ............... 82/121, 119, 120, 82/136, 158, 159, 905; 408/35; 409/190, 198, 230, 221; 29/27 C, 39, 40, 564, 564.1

[56] References Cited

U.S. PATENT DOCUMENTS

| | | | |
|---|---|---|---|
| 4,090,281 | 5/1978 | Hautau | 408/35 X |
| 4,413,539 | 11/1983 | Ishizuka et al. | 82/120 |
| 5,007,314 | 4/1991 | Hafla et al. | 82/159 X |
| 5,455,993 | 10/1995 | Link et al. | 29/40 |
| 5,632,075 | 5/1997 | De Bernardi et al. | 29/40 |
| 5,657,523 | 8/1997 | Lin et al. | 29/48.5 A |
| 5,842,392 | 12/1998 | Pfeifer et al. | 82/1.11 |

FOREIGN PATENT DOCUMENTS

| | | |
|---|---|---|
| 34 10 281 | 9/1985 | Germany . |
| 6-000743 | 1/1994 | Japan . |
| 8-290310 | 11/1996 | Japan . |

OTHER PUBLICATIONS

Co-pending U.S. Patent Appln. 08/945,339 filed on Oct. 27, 1997.

*Primary Examiner*—Andrea L. Pitts
*Assistant Examiner*—Henry W. H. Tsai
*Attorney, Agent, or Firm*—Armstrong, Westerman, Hattori, McLeland & Naughton

[57] ABSTRACT

Positioning engaging members (27) are provided between a base table (10) and a turret (11) which is indexed relative to the base table (10) by a driving force of an indexing/tool turning motor (32) so as to be engageable with or disengageable from each other. The positioning engaging members (27) engage with each other to prevent the turret (11) from turning. Further, the driving force of the indexing/tool turning motor (32) is transmitted or not transmitted to the turret (11) by clutch pieces (31). The driving force of the indexing/tool turning motor (32) is transmitted to a turning tool (14) mounted on tool mounting portions (12) of the turret (11) via a power transmission member. The positioning engaging members (27) engage with or disengage from each other by an engaging unit. Further, the engaging means interlocks with the disengagement between the positioning engaging members (27) to permit the clutch pieces (31) to engage with each other while the engaging unit interlocks with the engagement between the positioning engaging members (27) to permit the clutch pieces (31) to disengage from each other.

1 Claim, 7 Drawing Sheets

F I G. 1
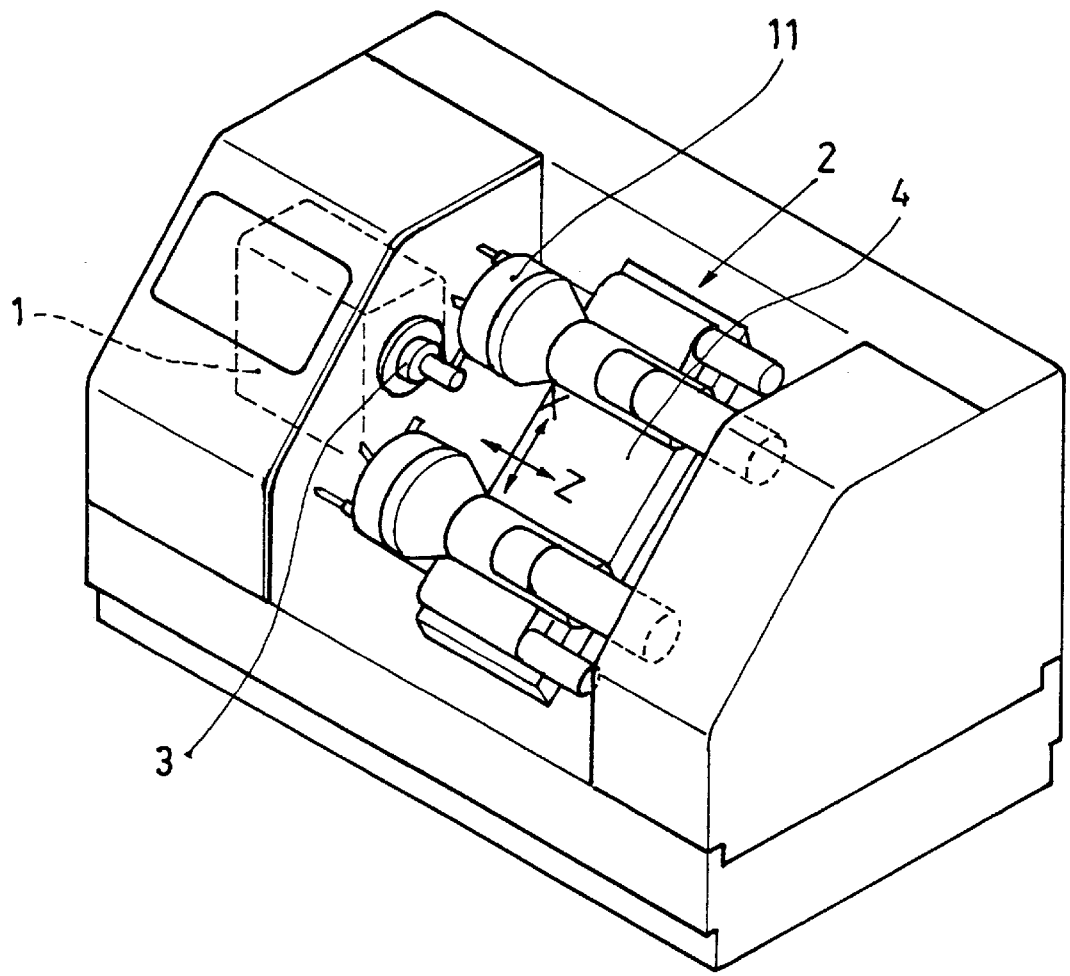

TURRET DEVICE

TECHNICAL FIELD

The present invention relates to a turret device to be used in a working machine such as an NC lathe.

BACKGROUND TECHNOLOGY

There has been recently an increasing demand for an NC lathe provided with a turret device since a machining apparatus, particularly, a lathe is able to realize automatic machining operations at high speed and can cope with a computer-integrated flexible manufacturing system.

The turret device is structured such that a rotary table called a turret which is provided on a tab base table (tool slide), and has normally 5 to 12 indexing positions, is indexed while rotated (hereinafter referred to as simply indexed). Tool mounting portions are formed on an outer periphery or end surface of the turret, and various tools such as turning tools and drills are mounted on these tool mounting portions wherein an appropriate tool is selected from the various tools depending on the type of machining process desired so as to index the selected tools in machining positions. Such an indexing of the turret is performed by the driving force from an indexing actuator.

The turning tools and drills can be frequently mounted on the tool mounting portions of the turret, wherein machining such as drilling a hole into a workpiece can be performed by driving the turning tools mounted on the tool mounting portions.

Since the indexing, positioning and fixing of the turret in the conventional turret device have been performed by a hydraulic cylinder as a driving source, a large-sized power unit comprising a hydraulic pump, an electric motor for driving the pump, an oil tank, etc. has been needed.

An arrangement using an electric motor for indexing a turret has been known wherein the positioning and fixing of the turret has been performed by the hydraulic cylinder, which is indispensable to the power unit.

Even if the indexing of the turret is performed by the electric motor, the motor for driving the turning tool is provided in addition to the motor for indexing the turret, whereby the turning tool is driven and turned by a driving force of the motor for driving the turning tool, thereby performing the machining of the workpiece.

However, since it is not necessary that the indexing of the turret and the driving of the turning tool be performed at the same time, it is possible to reduce the cost of the parts and to perform an easy control if the indexing of the turret and the driving of the turning tool can be achieved by a common electric motor.

Further, if the driving source for positioning and fixing the turret comprises the electric motor, the reduction of components and the easy control are further enhanced.

Since the present invention has been made in view of the above concept, it provides a turret device capable of achieving the indexing of the turret and the driving of the turning tool by a common electric actuator, thereby eliminating the power unit.

DISCLOSURE OF THE INVENTION

To achieve the above object, a first aspect of the invention is characterized in comprising the following construction in a turret device comprising a base table, a turret which is indexed about a given rotary center relative to the base table, and positioning engaging members which are provided between the base table and the turret so as to be engageable with or disengageable from each other for preventing the turret from turning when they engage with each other. The turret device further comprises:

(a) an electric actuator for indexing the turret;
(b) clutch members for transmitting or not transmitting a driving force of the electric actuator to the turret;
(c) tool mounting portions provided on the turret;
(d) a power transmission member for transmitting the driving force of the electric actuator to turning tools mounted on the tool mounting portions; and
(e) an engaging means for permitting the positioning engaging members to engage with or disengage from each other, permitting the clutch members to engage with each other while interlocking with the disengagement between the positioning engaging members, and permitting the clutch members to disengage from each other while interlocking with the engagement between the positioning engaging members.

According to the invention having the aforementioned construction, the indexing of the turret and the driving of the turning tool can be performed by one electric actuator. That is, the driving force of the electric actuator for indexing the turret is transmitted to the turning tool via the power transmission member. It is necessary that the transmission of the driving force of the electric actuator to the turret be performed merely when the turret is indexed, and the driving force from the electric actuator is not transmitted to the turret when the turning tool is turned upon completion of indexing of the turret.

Accordingly, the clutch members permit the electric actuator and turret to engage with or disengage from each other, and they transmits the driving force of the electric actuator to the turret merely when the turret is indexed.

The transmission between the electric actuator and turret by the clutch members, and engagement and disengagement between the positioning engaging members are respectively performed by the engaging means while they are interlocked with each other. That is, the engaging means permits the clutch members to engage with each other interlocking with the disengagement between the positioning engaging members while permitting the clutch members to disengage with each other interlocking with the engagement between the positioning engaging members. As a result, the engagement and disengagement between the positioning engaging members and those of the clutch means can be easily controlled.

Further, a second aspect of the invention is characterized in comprising the following construction in a turret device comprising a base table, a turret which is indexed about a given rotary center relative to the base table, and positioning engaging members which are provided between the base table and the turret so as to be engageable with or disengageable from each other for preventing the turret from turning when they engage with each other, comprising:

(a) a first electric actuator for indexing the turret;
(b) clutch members for transmitting or not transmitting a driving force of the first electric actuator to the turret;
(c) an engaging means for not transmitting the driving force of the first electric actuator to the turret when the positioning engaging members engage with each other; and
(d) a second electric actuator for driving the engaging means.

According to the invention, the engaging means is driven by the second electric actuator, thereby eliminating a power unit which is required for a hydraulic cylinder, reducing the cost of parts, and enhancing the easy control. The second electric actuator is not limited to the electric motor but may be formed of an electric cylinder, etc.

BRIEF DESCRIPTION OF DRAWINGS

FIG. 1 is a perspective view showing an external configuration of a turret NC lathe;

BEST MODE FOR CARRYING OUT THE INVENTION

Figure 2:
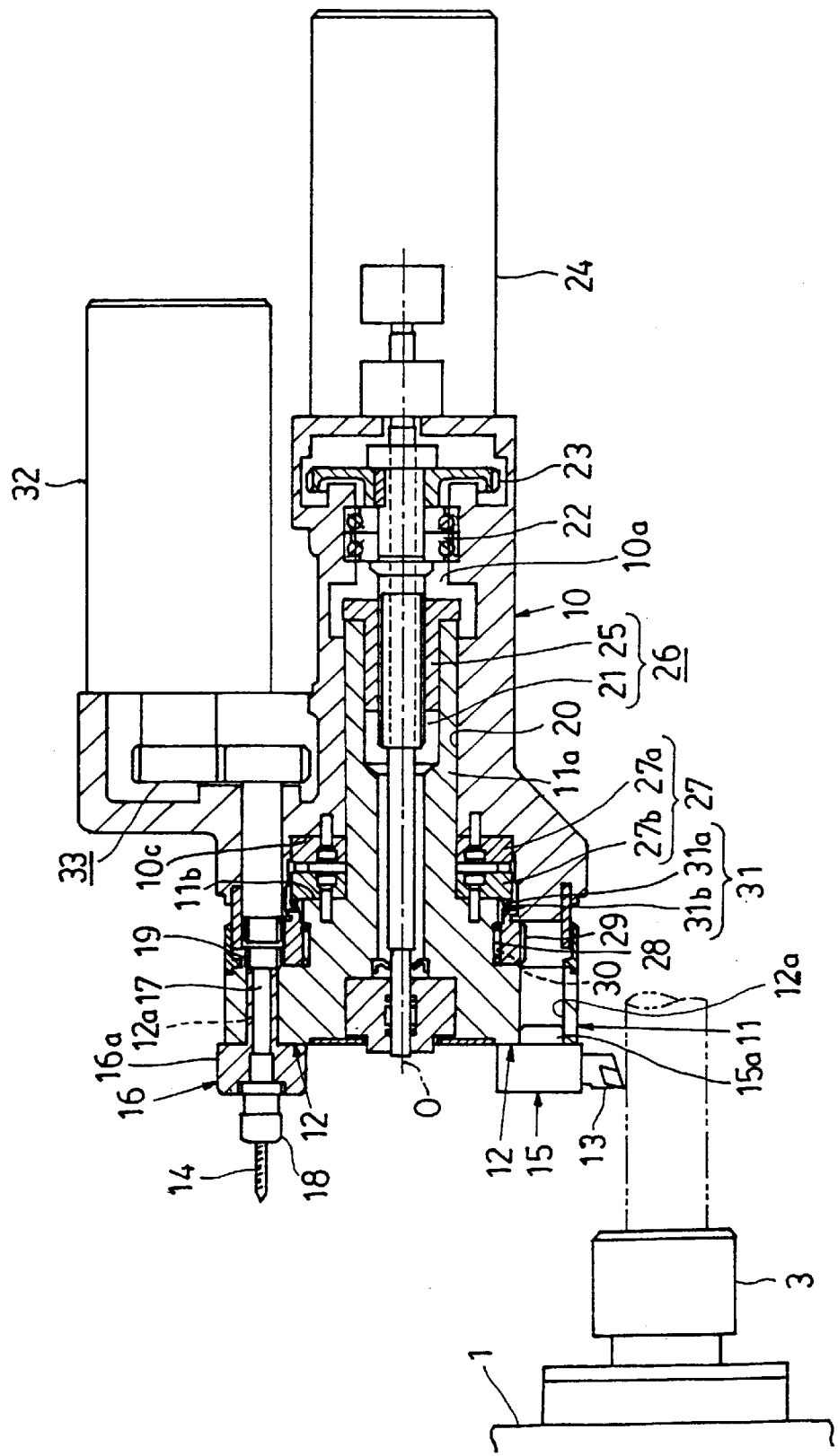
FIG. 2 is a sectional plan view of a turret device according to a preferred embodiment of the invention.

The best mode for carrying out the invention will be now described with reference to the attached drawings.

FIG. 1 is a perspective view showing an external configuration of the turret NC lathe. As shown in the same figure, the turret NC lathe comprises a headstock 1 and a turret device 2. The headstock 1 has a chuck 3 mounted thereon for holding a workpiece, and the headstock 1 serves to rotate the workpiece held by the chuck 3 by a main spindle motor (not shown) incorporated therein.

Various tools necessary for a cutting processes can be mounted on the turret device 2, and a turret 11 (two turrets 11 with the workpiece interposed therebetween in FIG. 1) is provided on the turret device 2 for appropriately selecting the tool and cutting the workpiece held by the chuck 3 of the headstock 1. The cutting process can be performed by moving a tool slide 4 provided on the turret device 2 in the direction of a main spindle center line (Z axis) and in the direction of an X axis which crosses at right angles with the main spindle center line.

FIG. 2 is a sectional plan view of the turret device according to the preferred embodiment of the invention.

The turret device 2 comprises a base table 10 provided on the tool slide 4 and a turret 11 which is rotatably mounted on the base table 10. The tool slide 4 is driven in the directions of the Z and X axes by a tool slide driving apparatus, not shown.

A plurality of tool mounting portions 12 are provided on a front end outer peripheral edge of the turret 11 with given indexing angles. A cutting tool 13 such as a turning tool secured to a tool holder 15 and a rotary tool 14 such as a drill secured to another tool holder 16 can be mounted on the tool mounting portions 12.

The tool holder 15 of the cutting tool 13 can be firmly fixed to the tool mounting portion 12 such that a protrusion 15a formed on the tool holder 15 is inserted into and positioned in a mounting hole 12a defined in the tool mounting portion 12, and they are firmly fixed to each other by a fastening device such as a bolt, not shown.

The tool holder 16 of the rotary tool 14 has a rotatable tool rotary shaft 17 which penetrates the center of a holder body 16a, and a tool chuck 18 for holding the rotary tool 14 is provided at the tip end of the tool rotary shaft 17. Further, a tool rotary gear 19 is provided at the base end of the tool rotary shaft 17.

The tool holder 16 of the rotary tool 14 is firmly fixed to the tool mounting portion 12 such that the holder body 16a is inserted into the mounting hole 12a which is bored in the tool mounting portion 12 of the turret 11, and they are firmly fixed to each other by a fastening device such as a bolt, not shown. At this time, the tool rotary gear 19 provided at the base end of the tool rotary shaft 17 penetrates the turret 11 and protrudes backward.

The tool mounting portions 12 of the turret 11 and the tools may be structured in the same manner as the known turret and mounting tools which are applied to machine tools in addition to the aforementioned structure.

A base end portion 11a formed in the small diameter part of the turret 11 is rotatable about a rotary center O via a slide bearing 20 formed in a hollow part 10a of the base table 10, and it is mounted on the base table 10 to be movable linearly along the rotary center O.

A ball screw 21 is provided in the hollow part 10a of the base table 10 coaxially with the rotary center O via a rolling bearing 22. A motive transmission gear 23 is secured to the base end of the ball screw 21.

A switching motor 24 (second electric actuator) formed of a servomotor is mounted on the base table 10. A driving gear, not shown, meshing with the motive transmission gear 23 is secured to the rotary shaft of the switching motor 24, wherein the driving force of the switching motor 24 is transmitted to the ball screw 21 via the driving gear and the motive transmission gear 23 so as to drive and turn the ball screw 21.

A nut 25 is screwed into the ball screw 21, and it is fixed to the base end portion 11a of the turret 11. Accordingly, the nut 25 moves linearly along the rotary center O as the ball screw 21 turns so that the turret 11 moves linearly along the rotary center O together with the nut 25. That is, the ball screw 21 and nut 25 structures comprise a screw feed mechanism 26 for linearly moving the turret 11.

Further, the turret 11 has an annular gear 29 which is mounted coaxially to the rotary center O via a needle bearing 28. A gear meshing with the tool rotary gear 19 of the tool rotary shaft 17 and also with a gear for transmitting the driving force of an indexing/tool turning motor 32, described later, is formed on the outer peripheral surface of the annular gear 29, and the inner peripheral surface of the annular gear 29 is rotatably supported by the needle bearing 28.

A recess 30 defined in the outer peripheral surface of the turret 11 serves as an inner ring of the needle bearing 28 so that the needle bearing 28 can be rotated relative to the turret 11 but is prevented from moving in the direction of the rotary center O. Accordingly, the needle bearing 28 moves together with the turret 11 in the same direction when the turret 11 moves linearly along the rotary center O.

Figure 3:
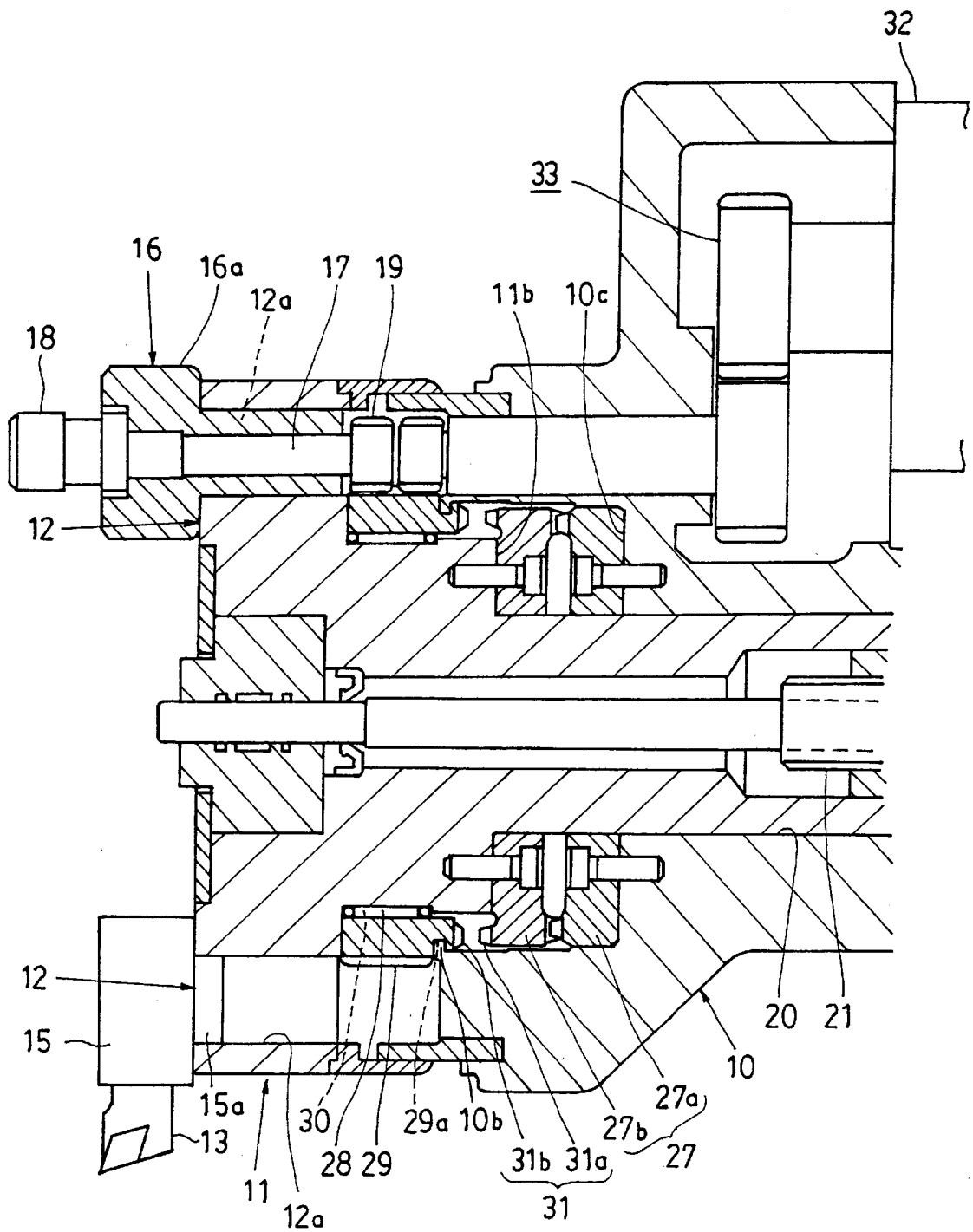
FIG. 3 is an enlarged sectional plan view showing a state where positioning engaging members engage with each other and clutch pieces disengage from each other.
Figure 4:
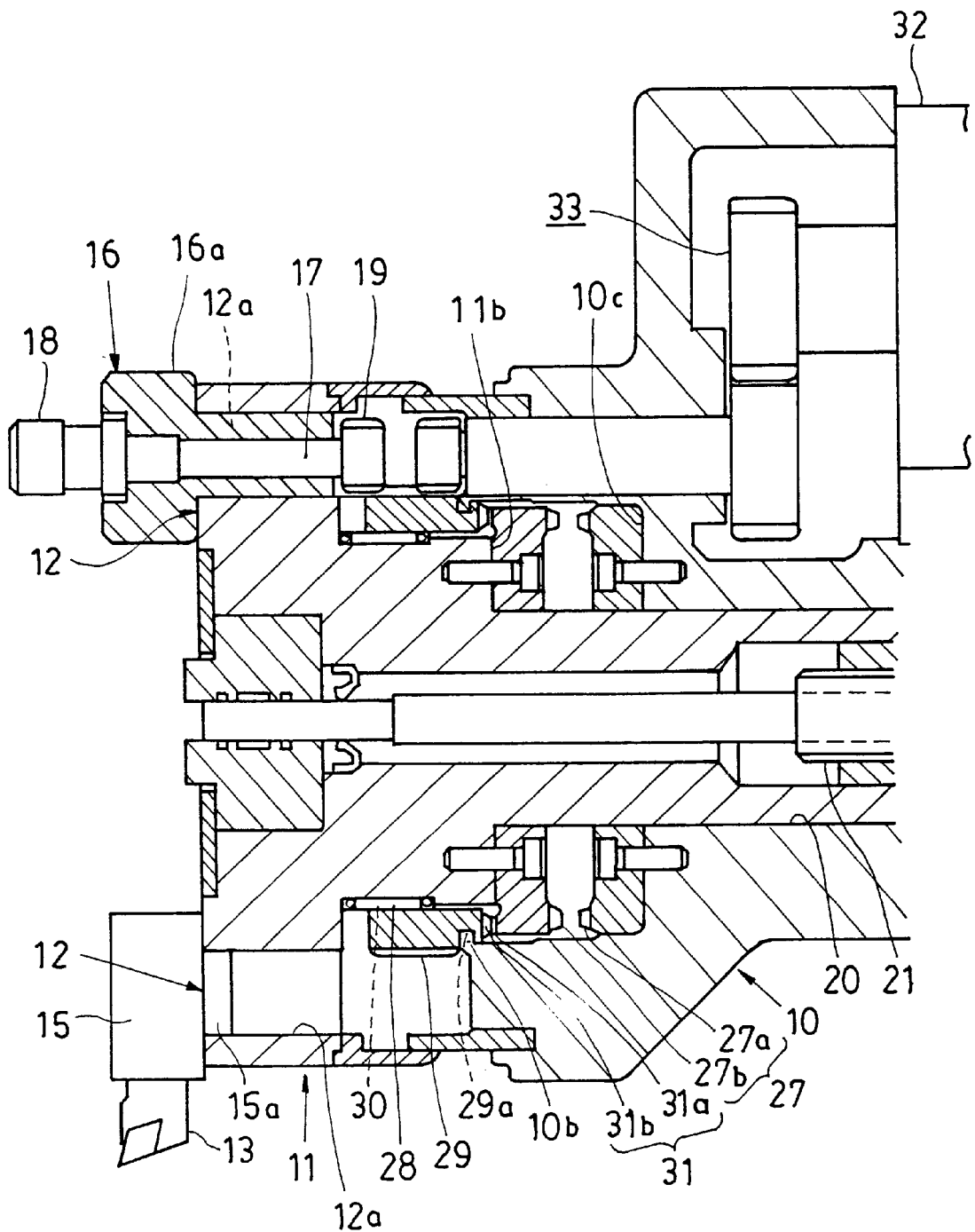
FIG. 4 is an enlarged sectional plan view showing a state where the positioning engaging members disengage from each other and the clutch pieces engage with each other.

The annular gear 29 is structured, as shown largely in FIGS. 3 and 4, so that a circumferential groove 29a defined in the rear end thereof engages with a protrusion 10b formed on the base table 10, wherein the annular gear 29 is held in a given position by the engagement between the groove 29a and protrusion 10b.

The hollow part 10a of the base table 10 has a large diameter part at the tip end side demarcating a stepped part 10c while the turret 11 has a large diameter part at the tip end side thereof demarcating a stepped part 11b. The stepped part 10c of the base table 10 and stepped part 11b of the turret 11 are provided with the positioning engaging member 27 at the surfaces thereof comprising a base table side coupling 27a and a turret side coupling 27b to form a curvic coupling.

Figure 7A:
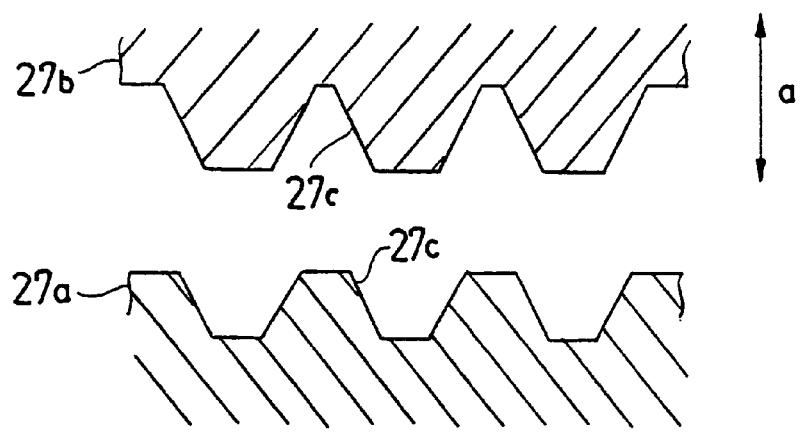
FIG. 7A is a sectional view of the positioning engaging members according to the preferred embodiment of the invention wherein tooth profiles thereof are enlarged.
Figure 7B:
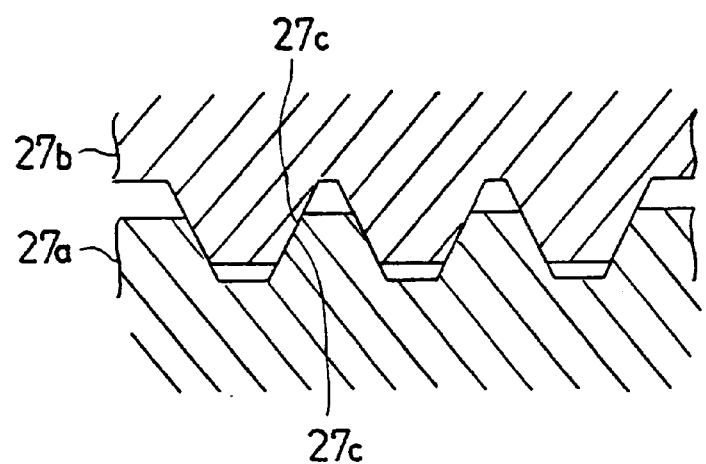
FIG. 7B is a sectional view of the positioning engaging members which engage with each other wherein tooth profiles thereof are enlarged.

The couplings 27a and 27b are positioned with tooth profiles formed like a known crown gear meshing with each other, and they have inclined tooth profiles 27c respectively formed with given pitches as shown in FIGS. 7A and 7B. When the turret 11 moves linearly, the turret side coupling 27b fixed to the turret 11 moves in a direction denoted by a, tooth profiles 27c of the base table side coupling 27a and those of the turret side coupling 27b engage with each other or disengage from each other.

Clutch pieces 31a and 31b constituting a clutch member 31 are respectively formed at the rear end edge of the annular gear 29 and at the front surface of the turret side coupling 27b of the positioning engaging member 27 provided on the turret 11 so as to oppose each other. Inclined tooth profiles are formed on the surfaces of the clutch pieces 31a and 31b opposing each other with given pitches like those of the couplings 27a and 27b. These tooth profiles engage with or disengage from each other when the turret 11 moves linearly along the rotary center O.

The engagement and disengagement between clutch pieces 31a and 31b and between the couplings 27a and 27b have an opposite relationship. That is, when the turret 11 moves rightward relative to the base table 10 in FIG. 2, the couplings 27a and 27b engage with each other while clutch pieces 31a and 31b disengage from each other.

FIG. 3 is an enlarged view showing a state where the couplings 27a and 27b of the positioning engaging member 27 engage with each other to prevent the rotation of the turret 11 and the clutch pieces 31a and 31b of the clutch member 31 disengage from each other.

Since the turret 11 is prevented from rotating by the engagement between the couplings 27a and 27b in the state shown in the same figure, it cannot be indexed. When the turret 11 moves leftward relative to the base table 10 by the turning of the ball screw 21 as shown in FIG. 2, the couplings 27a and 27b disengage from each other, then the clutch pieces 31a and 31b engage with each other.

FIG. 4 is an enlarged view showing a state where the couplings 27a and 27b disengage from each other and the clutch pieces 31a and 31b engage with each other.

As shown in the same figure, the tool rotary gear 19 provided on the tool holder 16 of the rotary tool which is mounted on the tool mounting portion 12 of the turret 11 meshes with the annular gear 29.

The indexing/tool turning motor 32 formed of a servomotor which serves as a first electric actuator for indexing the turret and driving the turning tool is mounted on the base table 10, and the driving force of the indexing/tool turning motor 32 is transmitted to the annular gear 29 via a gear mechanism 33 so as to rotate the annular gear 29.

Accordingly, the indexing/tool turning motor 32 rotates the annular gear 29 via the gear mechanism 33 in the state shown in FIG. 3 so that only the tool rotary shaft 17 provided on the tool holder 16 is rotated by the rotation of the annular gear 29 to drive and turn the rotary tool 14. Meanwhile, in the state shown in FIG. 4 where the couplings 27a and 27b disengage from each other and the clutch pieces 31a and 31b engage with each other, the rotation of the annular gear 29 is transmitted to the turret side coupling 27b fixed to the turret 11 so that the indexing/tool turning motor 32 indexes the turret 11.

According to the present invention as set forth above, the annular gear 29 also serves as a power transmission member for transmitting the driving force of the indexing/tool turning motor 32 to the rotary tool 14 mounted on the tool mounting portions 12. The annular gear 29 also serves as another power transmission member for transmitting the driving force of the indexing/tool turning motor 32 to the turret 11.

The clutch member 31 comprising the clutch pieces 31a and 31b serves to transmit or not to transmit the driving force from the indexing/tool turning motor 32 to the turret 11 via the annular gear 29.

The screw feed mechanism 26 which is driven by the switching motor 24 forms an engaging means for permitting the positioning engaging members 27 to engage with or disengage from each other and for permitting the clutch members 31 to engage with or disengage from each other in reverse to the positioning engaging members 27.

Figure 5:
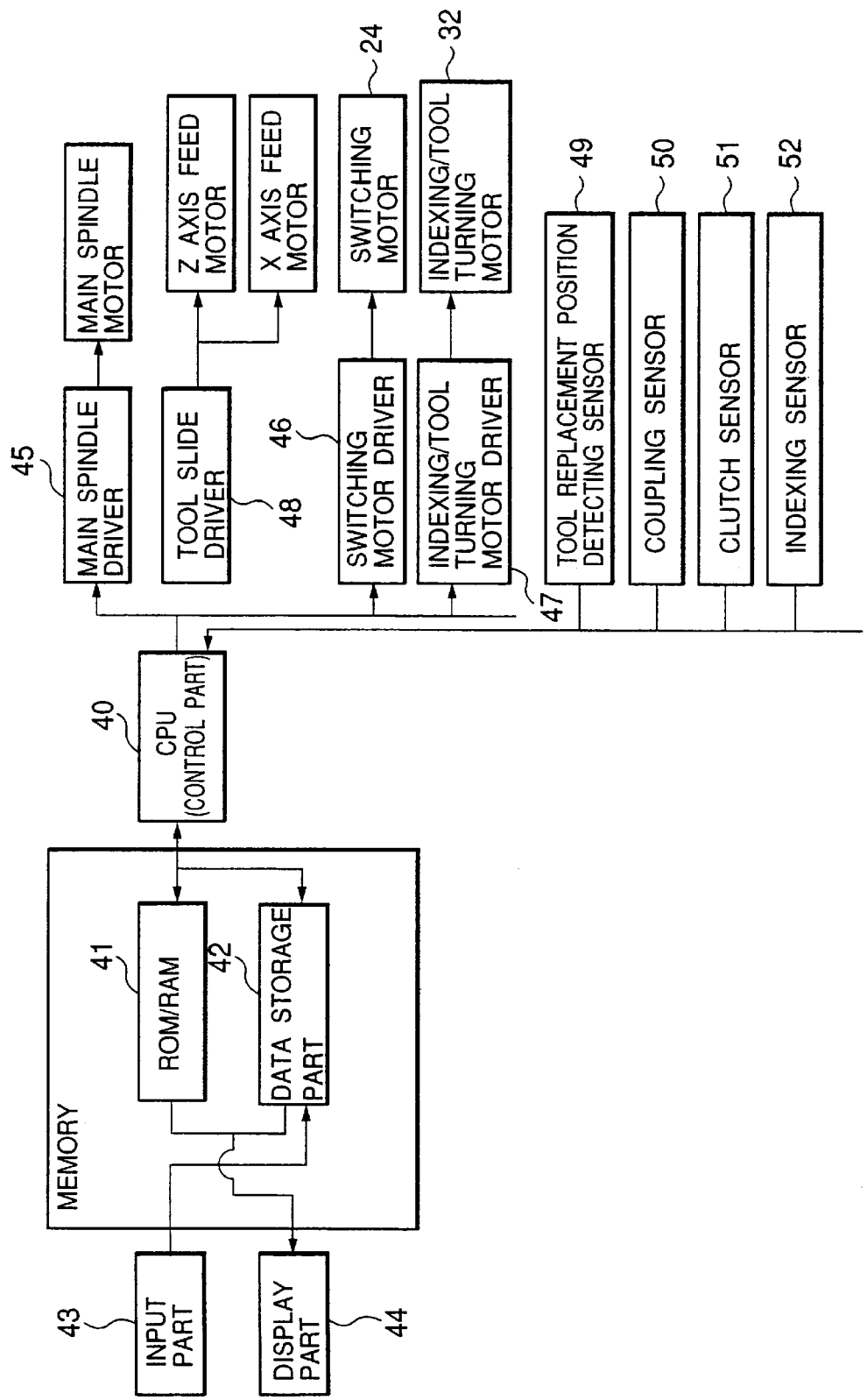
FIG. 5 is a block diagram showing a control system of the turret device.

FIG. 5 is a block diagram showing a control system of the aforementioned turret device indexing/tool turning motor 32

As shown in the same figure, the control system of the turret device 2 includes a control part (CPU) 40, a ROM/RAM 41, a data storage part 42, an input part 43, a display part 44, a main spindle driver 45, a switching motor driver 46, an indexing/tool turning motor driver 47, a tool slide driver 48, a tool replacement position detecting sensor 49, a coupling sensor 50, a clutch sensor 51, an indexing sensor 52, etc.

A control program for driving the turret device 2 is stored in advance in the ROM/RAM 41. The control part 40 controls each component of the turret device 2 based on the control program. The input part 43 comprises a keyboard, etc., and data necessary for controlling each component of the turret device 2 (selection of tools, shapes and dimensions of the workpiece to be machined, rotating speed of the main spindle, feeding speed of tools, etc.) are inputted through the input part 43. This data can be inputted by entering numerical values on a drawing displayed on the display part 44 on an interactive basis.

Data inputted from the input part 43 and various data necessary for driving and controlling the turret device 2 are respectively stored in the storage part 42.

The control part 40 outputs a given command based on the control program stored in the ROM/RAM 41, on the selection of tools (indexing of the turret) as stored in the data storage part 42, and on machining data The main spindle driver 45 drives a main spindle motor based on commands issued from the control part 40 to rotate the workpiece held by the chuck 3 of the headstock 1. The workpiece is machined by the movement of the tool slide 4 in the directions of the Z and X axes and by rotation of the rotary tool 14 by the indexingtool turning motor 32, if necessary.

The tool slide driver 48 drives the feed motor in the directions of the Z and X axes based on commands issued from the control part 40 to drive the tool slide 4 of the turret device 2 in the directions of the Z and X axes.

The switching motor driver 46 drives the switching motor 24 based on a command issued from the control part 40 so as to permit the couplings 27a and 27b to engage with or disengage from each other and to permit the clutch pieces 31a and 31b to engage with or disengage from each other for positioning and fixing the turret 11.

The indexing/tool turning motor driver 47 drives the indexing/tool turning motor 32 based on a command issued from the control part 40 so as to execute the indexing of the turret 11 or rotary driving of the rotary tool 14. The rotary driving of the rotary tool 14 is carried out when the workpiece is machined while the indexing of the turret 11 is carried out when the tools are selected before or after the workpiece is machined.

The tool replacement position detecting sensor 49 detects whether the turret device 2 is positioned in a tool replacement position (i.e., a given backward position, namely, tool origin of the tool slide 4 where the turret 11 can be indexed) or not based on the coordinate showing the present position of the tool slide 4.

The coupling sensor 50 monitors the engagement and disengagement between the couplings 27a and 27b, and detects the increase of rotary torque of the switching motor 24 and outputs a coupling completion signal to the control part 40 upon completion of engagement between the couplings 27a and 27b. The clutch sensor 51 monitors the engagement and disengagement between the clutch pieces 31a and 31b, and outputs a clutch completion signal to the control part 40 when they engage with each other. The indexing sensor 52 monitors the rotary angle when the turret 11 is indexing, and outputs an indexing completion signal to the control part 40 when the indexing operation is completed at the angular position which is issued by the control part 40.

As mentioned above, since these sensors 49 to 52 are structured to operate when detecting the rotary position of the servomotor or the variation of the rotary torque, a special sensor need not be provided.

Figure 6:
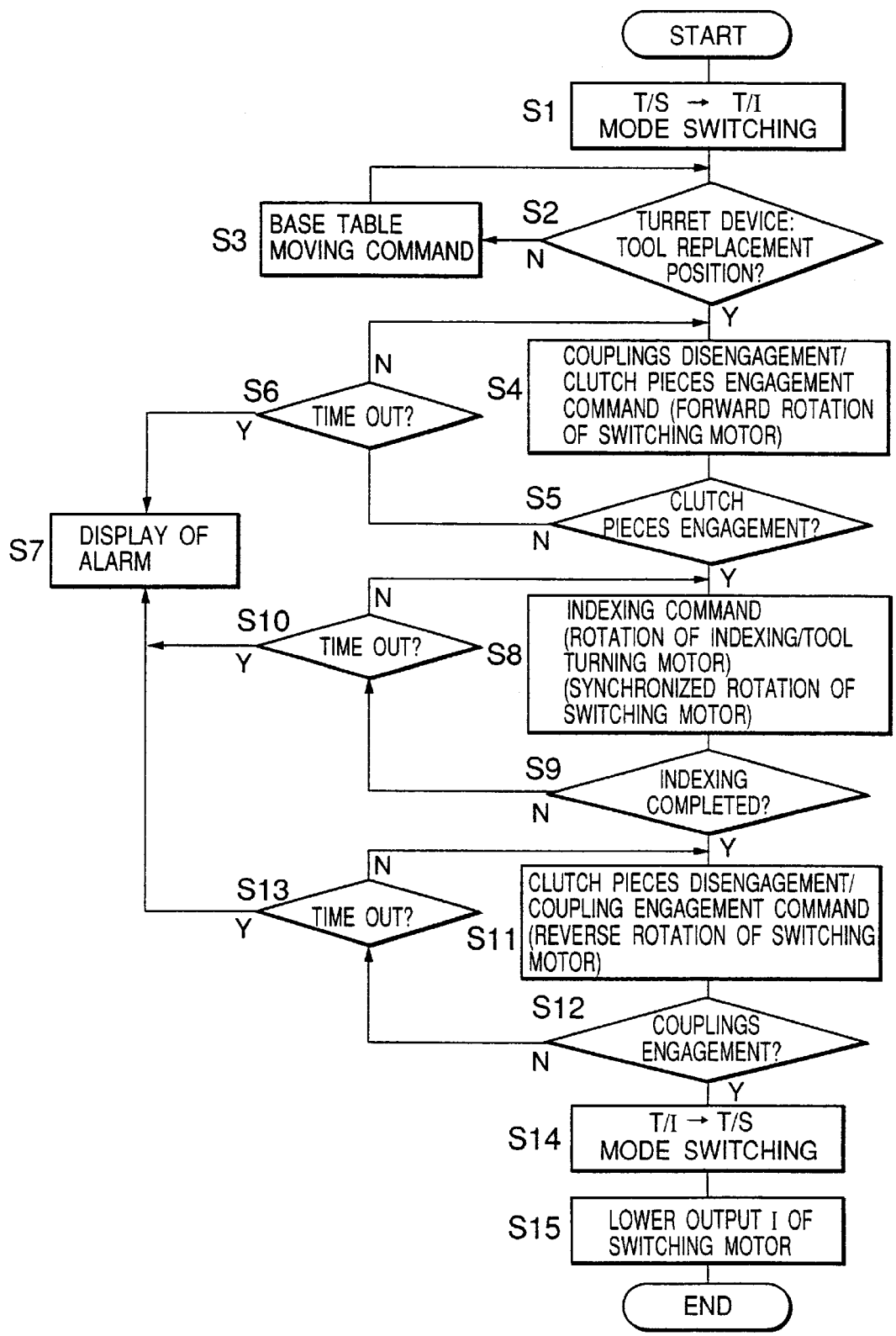
FIG. 6 is a flow chart showing a control operation of the turret device according to the control system in FIG. 5.

FIG. 6 is a flow chart showing a control operation for executing the indexing, positioning and fixation of the turret 11 of the turret device 2, and the rotary driving of the rotary tool 14 based on the control system having the structure set forth above. The control operation is executed mainly by the commands issued from the control part 40. Accordingly, the control operation set forth hereunder will be explained mainly with reference to the commands issued from the control part 40.

In the aforementioned turret device 2, the indexing/tool turning motor 32 serves as a driving source for executing the indexing of the turret 11 and rotary driving of the rotary tool 14. Since the rotating speed and rotating direction of the indexing/tool turning motor 32 are differentiated depending on the objects to be driven thereby, the control of the indexing/tool turning motor 32 is divided into a mode (T/I mode) for indexing the turret 11 and another mode (T/S mode) for rotary driving the rotary tool 14, wherein control programs corresponding to each mode are stored in the ROM/RAM 41.

First, when the process for indexing the turret 11 is executed for selecting a succeeding tool upon completion of the cutting process, the control part 40 starts the indexing of the turret 11 upon confirmation of the completion of the cutting process, then switches the control program of the indexing/tool turning motor 32 to the T/I mode (S1), and successively confirms whether the turret device 2 is positioned or not at present at the tool origin (a tool replacement position where the turret device 2 is rotated) (S2) in response to a signal issued from the tool replacement position detecting sensor 49. If the turret device 2 is not positioned at the tool origin, the control part 40 outputs a moving command signal to the tool slide driver 48 (S3), and then moves the tool slide 4 of the turret device 2 to the tool origin.

Upon confirmation that the turret device 2 is positioned at the tool origin, the control part 40 issues a driving command to the switching motor driver 46 to drive the switching motor 24 in the forward direction (S4). In this embodiment, a rotating direction of the switching motor 24 for moving the nut 25 of the screw feed mechanism 26 in the forward direction (leftward in FIG. 2) is defined as the forward direction.

When the switching motor 24 rotates in the forward direction, the driving force of the switching motor 24 is transmitted to the ball screw 21 of the screw feed mechanism 26 via the motive transmission gear 23 shown in FIG. 2 so that the ball screw 21 turns. As the ball screw 21 turns, the nut 25 moves forward linearly (leftward) along the rotary center O.

Since the turret 11 is fixed to the nut 25, the turret 11 also moves forward linearly together with the nut 25. As a result, the couplings 27a and 27b of the positioning engaging member 27 provided between the base table 10 and turret 11 disengage from each other so that the turret 11 is rotatable.

At this time, the friction between the ball screw 21 and nut 25 of the screw feed mechanism 26 is sufficiently small compared with that between the base end portion 11a of the turret 11 and slide bearing 20 of the base table 10, so that the turret 11 does not rotate but moves forward linearly.

When the switching motor 24 continues to rotate in the forward direction, clutch pieces 31a and 31b of the clutch member 31 engage with each other. In such a manner, upon completion of the engagement between the clutch pieces 31a and 31b, the rotary torque of the switching motor 24 increases sharply so that a clutch completion signal is outputted from the clutch sensor 51 (S5).

Since the control part 40 has a timer function, it measures time counting from the time of issuance of the driving command to the switching motor driver 46 (S6), and it decides that the apparatus is anomalous when the clutch completion signal is not inputted therein even if a given time elapses, then it stops the operation of the turret device 2, then indicates an alarm (S7).

Meanwhile, when the clutch completion signal is inputted within a given time, the control part 40 stops the rotation of the switching motor 24, then issues a driving command to the indexing/tool turning motor driver 47 (S8), thereby rotating the indexing/tool turning motor 32 in the rotating direction and rotating angle which are determined by the present tool fixing position and the tool fixing position to be selected next. The driving force of the indexnngtool turning motor 32 is transmitted to the turret 11 via the gear mechanism 33, annular gear 29, and clutch pieces 31a and 31b. Based on this driving force, the turret 11 is indexed to the tool fixing position to be selected next.

Meanwhile, when the turret 11 is indexed by the driving force of the indexing/tool turning motor 32, the nut 25 of the screw feed mechanism 26 fixed to the turret 11 is turned together with the turret 11. When the relative turning occurs between the nut 25 and ball screw 21, the ball screw 21 moves relatively linearly along the rotary center O by the relative turning of the nut 25. However, the ball screw 21 is prevented from moving in the direction of the rotary center O by the rolling bearing 22. As a result, the nut 25 moves and the turret 11 moves in the direction of the rotary center O.

When the turret 11 moves rightward by the screw feed mechanism 26, the turret side coupling 27b interferes with the base table side coupling 27a while it rotates so that the indexing/tool turning motor 32 does not rotate, while when the turret 11 moves leftward, the clutch piece 31a is strongly pressed against the clutch piece 31b which engages with the clutch piece 31a so that the indexing/tool turning motor 32 does not rotate.

Accordingly, in the preferred embodiment, the switching motor 24 rotates in a given rotating direction with a given ratio of rotating speed so as not to rotate the ball screw 21 and nut 25 of the screw feed mechanism 26 relative to each other in synchronization with the rotation of the indexing/tool turning motor 32 for indexing the turret 11.

The ratio of rotating speed and rotating direction between the indexing/tool turning motor 32 and switching motor 24 are respectively determined by the ratio of a train of gears and rotating direction of gears extending from the indexing/tool turning motor 32 to annular gear 29 (turret 11) and those extending from the switching motor 24 to ball screw 21, and by a control program stored in the ROM/RAM 41.

When the indexing of the turret 11 is completed in such a manner, the control part 40 detects the rotating position of the indexing/tool turning motor 32 so that an indexing completion signal is issued from the indexing sensor 52 (S9).

The control part 40 measures time counting from the time of issuance of the driving command to the indexing/tool turning motor driver 47 (S10), and it decides that the apparatus is anomalous when the clutch completion signal is not inputted therein even if a given time elapses, then it stops the operation of the turret device 2, then indicates an alarm (S7).

Meanwhile, when the indexing completion signal is inputted within a given time, the control part 40 stops the rotation of the indexing/tool turning motor 32, then issues the driving command to the switching motor driver 46 to rotate the switching motor 24 in an opposite direction (S11).

When the switching motor 24 rotates in the opposite direction, the driving force of the switching motor 24 is transmitted to the ball screw 21 of the screw feed mechanism 26 via the motive transmission gear 23 shown in FIG. 2 to turn the ball screw 21 in the opposite direction. As the ball screw 21 turns in the opposite direction, the nut 25 and turret 11 move backward (rightward in FIG. 2) linearly along the rotary center O. As a result, the clutch pieces 31a and 31b disengage from each other.

When the switching motor 24 continues to rotate in the opposite direction, the couplings 27a and 27b engage with each other as shown in FIG. 3. Upon completion of the engagement between the couplings 27a and 27b, the rotary torque of the indexing/tool turning motor 32 increases sharply so that the coupling completion signal is issued from the coupling sensor 50 (S12).

The control part 40 measures time counting from the time of issuance of the reverse rotation driving command to the switching motor driver 46 (S13), and it judges that the apparatus is anomalous and stops the operation of the turret device 2, then indicates an alarm when the coupling completion signal is not inputted even if a given time elapses (S7).

Meanwhile, since the selection of the next tool is completed when the coupling completion signal is inputted within a given time, the control part 40 switches the control mode of the succeeding indexing/tool turning motor 32 to the rotary driving mode (T/S mode) of the rotary tool 14 (S14) and lowers the output torque of the switching motor 24 (S15). The output torque of the switching motor 24 is applied between the couplings 27a and 27b via the screw feed mechanism 26, and it is decreased to a torque (holding torque) for sufficiently keeping the engagement between the couplings 27a and 27b. According to the preferred embodiment, since the couplings 27a and 27b comprise curvic couplings, and the linear motion of the turret 11 is performed by the screw feed mechanism 26, the holding torque can be reduced to a sufficiently small torque.

With the operations set forth above, the series of operations for tool replacement is completed, and thereafter the cutting process is carried out.

The screw feed mechanism 26 may be structured such that the nut 25 is positioned at the driving side while the ball screw 21 is positioned at the driven side. In this case, the ball screw 21 is fixed to the turret 11, and the ball screw 21 moves linearly by the turning of the nut 25 which can merely turn but does not move in the anal direction so that the turret 11 integrated with the ball screw 21 moves along the rotary center O, thereby forming the screw feed mechanism 26 in exactly the same manner as the case set forth above.

If the screw feed mechanism 26 does not require low friction and high accuracy, an ordinary screw may be used instead of the ball screw 21.

In this case, it is preferable to provide a means for restraining the rotation of the turret 11 (e.g. a key and a spline which disengage from each other at the position where the clutch pieces 31a and 31b engage with each other) immediately before the clutch pieces 31a and 31b engage with each other.

Hirth couplings, etc., having the same structures as the curvic couplings may be used as the aforementioned positioning engaging members 27 in addition to the curvic couplings. A friction coupling (brake) having a sufficient braking force or a shot pin can be used as a positioning means instead of the couplings 27a and 27b as shown in FIG. 2, etc.

In the preferred embodiment set forth above, the engaging means of the positioning engaging members 27 and the clutch member 31 is formed of the screw feed mechanism 26 which is driven by the switching motor 24 but it may be formed of fluid pressure such as hydraulic pressure or pneumatic pressure so as to move the turret 11 in the axial direction.

Industrial Applicability

According to the present invention, the turning of the turret and the driving of the turning tools can be performed by a common driving motor, thereby making the turret device small-sized, reducing the cost of the parts, and enhancing the easy control.

What is claimed is:

1. In a turret device comprising a base table, a turret which is indexed about a given rotary center relative to the base table, and positioning engaging members which are provided between the base table and the turret so as to be engageable with or disengageable from each other for preventing the turret from turning when they engage with each other, said turret device further comprising:

a first electric actuator for indexing the turret;

clutch pieces for transmitting or not transmitting a driving force of the first electric actuator to the turret;

tool mounting portions provided on the turret;

a power transmission member for transmitting the driving force of the first electric actuator to turning tools mounted on the tool mounting portions;

an engaging means for permitting the positioning engaging members to engage with or disengage from each other by moving said positioning engaging members linearly along the rotary center of said turret by a screw feed mechanism, permitting the clutch pieces to engage with each other while interlocking with the disengagement between the positioning engaging members, and permitting the clutch pieces to disengage from each other while interlocking with the engagement between the positioning engaging members; and a second electric actuator for driving said screw feed mechanism of said engaging means.

* * * * *